April 25, 1950 W. R. WEEMS ET AL 2,505,021
ERECTING DEVICE FOR GYROSCOPES
Filed Oct. 1, 1945 4 Sheets-Sheet 1
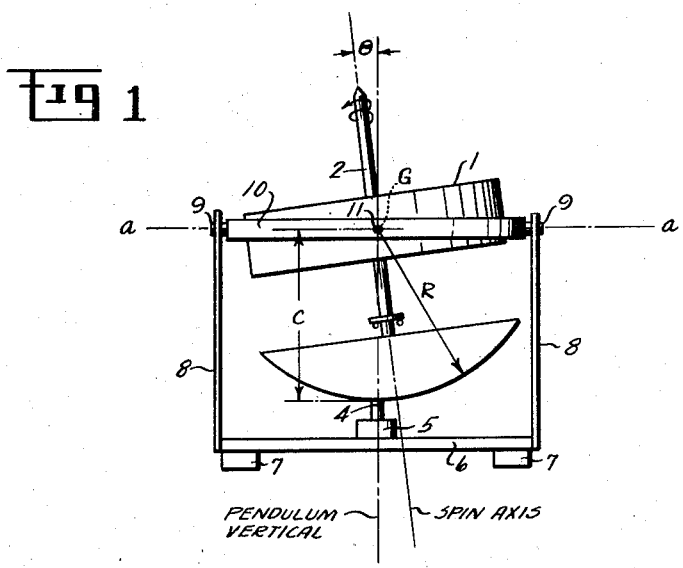
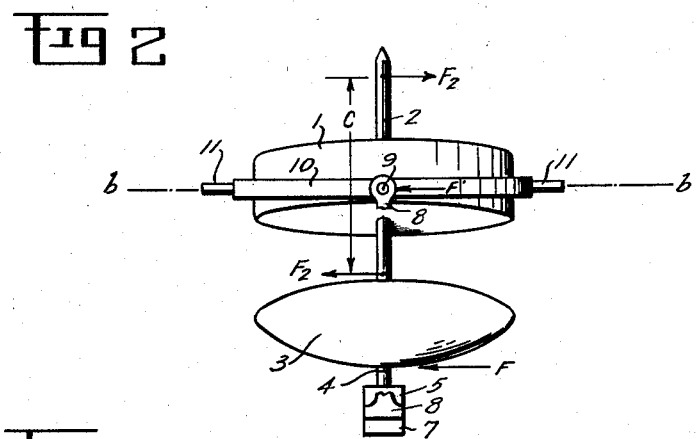
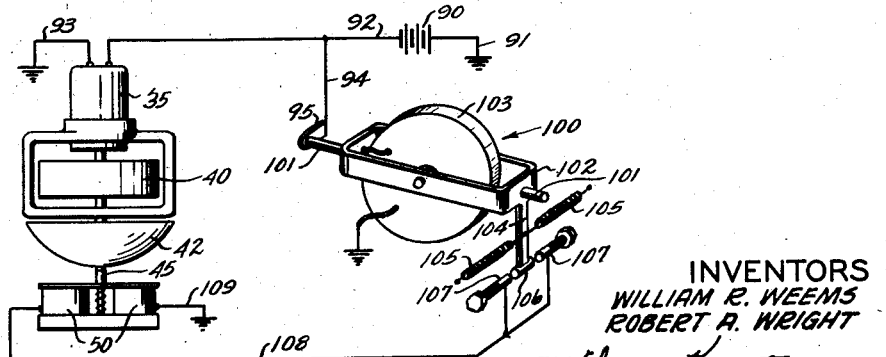
INVENTORS
WILLIAM R. WEEMS
ROBERT A. WRIGHT
BY
ATTORNEYS April 25, 1950 W. R. WEEMS ET AL 2,505,021
ERECTING DEVICE FOR GYROSCOPES
Filed Oct. 1, 1945 4 Sheets-Sheet 2
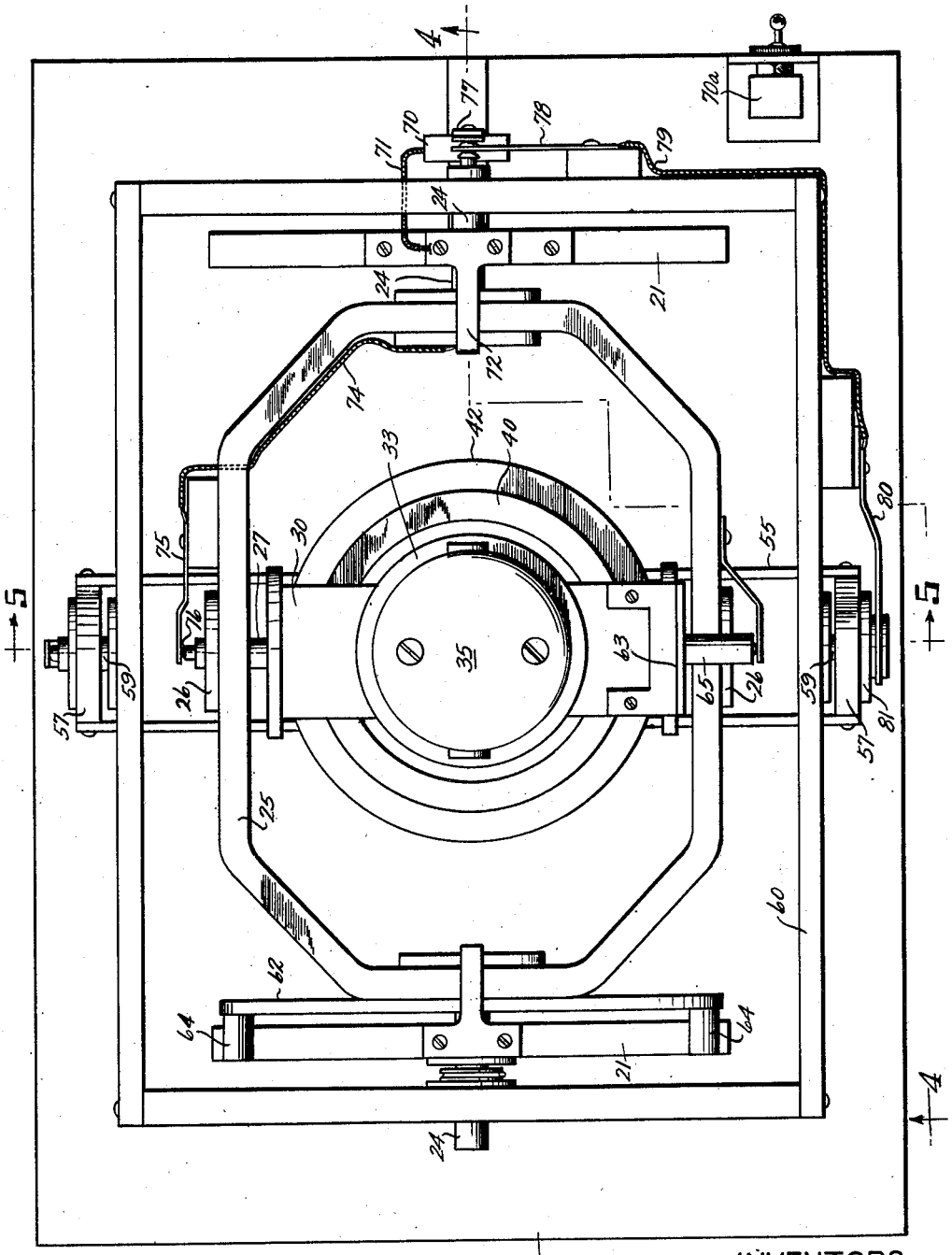
INVENTORS
WILLIAM R. WEEMS
ROBERT A. WRIGHT
BY
ATTORNEYS April 25, 1950 W. R. WEEMS ET AL 2,505,021
ERECTING DEVICE FOR GYROSCOPES
Filed Oct. 1, 1945 4 Sheets-Sheet 3

INVENTORS
WILLIAM R. WEEMS
ROBERT A. WRIGHT
BY
ATTORNEY

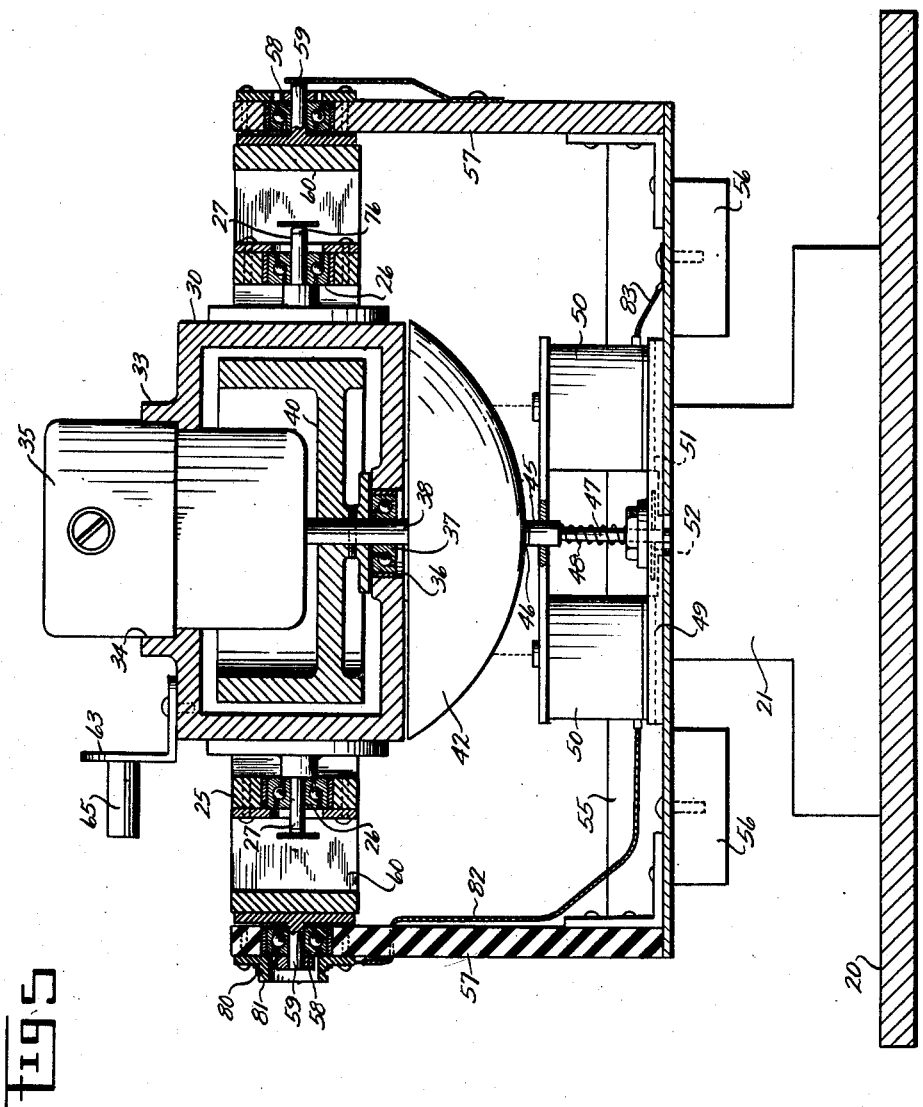

Patented Apr. 25, 1950

2,505,021

UNITED STATES PATENT OFFICE 2,505,021

ERECTING DEVICE FOR GYROSCOPES

William R. Weems and Robert A. Wright, Dayton, Ohio

Application October 1, 1945, Serial No. 619,728

4 Claims. (Cl. 74—5.34)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a novel means for utilizing the force of friction in erecting a gyroscope, particularly of the character employed for effecting automatic control or flight attitude indication on an airplane.

In the use of a non-pendulous or free gyroscope to establish a vertical or horizontal reference on an airplane the gyroscope if not acted on by external torques would maintain its axis fixed in space, and its spin axis would not remain in the true vertical due to rotation of the earth and movement of the airplane relative to the earth. Accordingly, various means have been proposed for applying an erecting torque to a free gyroscope such that the spin axis points to the center of the earth. Erection devices heretofore in use have generally employed pendulums which control air jets or electromagnets to produce torques on the gyro for causing erection of the same.

We are aware that for many years it has been known that a rounded peg on a spinning top assists in causing erection of the top due to the action of friction, see "Applied Gyrodynamics" by Ferry—John Wiley and Sons, publishers, 1932, pp. 76 and 77, articles 45 and 46 and pages 5 to 7 inclusive N. A. C. A. report No. 128—1922. So far as we are aware, however, it has never been proposed to utilize this very simple and effective principle in conjunction with a gravity controlled pendulum to cause erection of a gyroscope.

In accordance with one form of the present invention the gyroscope is mounted in gimbals and the spin axle is provided on its lower end with a hemispherical head which engages a friction plunger carried by a pendulum pivotally supported to have either one or two degrees of freedom. Rotation of the spin axle causes friction between the hemispherical head and the plunger such that if the spin axle axis is not coincident with the vertical as established by the pendulum the friction force will produce a torque on the gyroscope causing precession of the spin axle into the pendulum vertical. Where acceleration forces on the pendulum, due to turning of the aircraft, produce an undesirable effect, means are provided for withdrawing the plunger from contact with the hemispherical head on the gyro spin axle leaving the gyro free. The means for cutting out the gyro erecting device is preferably electrically actuated and may be controlled manually, by radio or by a lateral inclinometer or turn indicator.

It is, therefore, the principal object of the invention to provide an erecting mechanism for gyroscopes which utilizes friction forces to create an erecting torque.

It is a further object of the invention to provide a simple means for rendering the erecting means ineffective, for example, during turns of an aircraft.

It is another object of the invention to provide a friction erection means for a gyroscope wherein the erecting means includes a pendulum having a friction element in engagement with an element driven by the gyrorotor such that the friction force produces a torque on the gyroscope causing precession of the gyroscope in a direction such as to bring the spin axis of the gyroscope into coincidence with a vertical determined by the pendulum.

Other objects and features of the invention will appear by reference to the detailed description hereinafter given, taken in conjunction with the appended drawings, in which:

Fig. 1 is a diagrammatic view in front elevation illustrating the principles of the invention;

Fig. 2 is a view of the structure of Fig. 1, in side elevation;

Fig. 3 is a top plan view of a gyroscopic control device incorporating the principles of the invention;

Fig. 5 is a view partly in section taken on line 5—5 of Fig. 3; and

Fig. 6 is a schematic wiring diagram of the device of Fig. 3 showing the erection cut-out switch operated by a rate-of-turn gyroscope.

Figure 4:
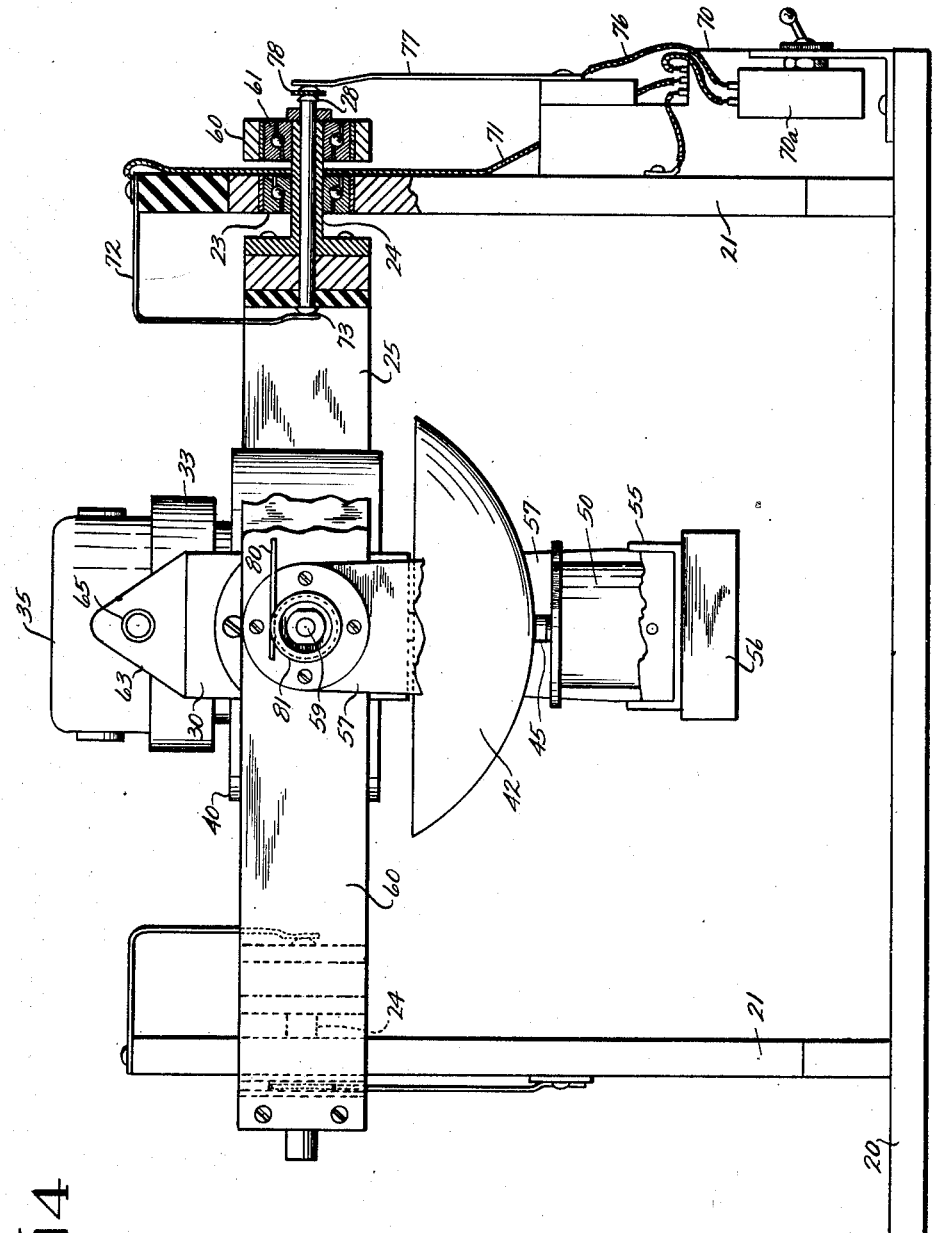
Fig. 4 is a view partly in section taken on line 4—4 of Fig. 3.

The basic features of the invention will be understood by reference to Figs. 1 and 2 of the drawings. As seen in these figures the reference numeral 1 indicates a gyroscope rotor of the non-pendulous type having a spin axle 2 adapted to be mounted in bearings in a gimbal ring mounting not shown and rotated in a clockwise direction as seen from above by any suitable means. The gyrorotor 1 is assumed to be gimbal suspended to have three degrees of freedom of rotation.

A friction element 3 is rigidly secured to the lower end of the spin axle 2 and is constructed to have its friction surface in the form of a portion of a sphere of radius R. The friction element 3 rotates continuously with the rotor 1 and frictionally engages a spring loaded plunger 4 suitably faced with friction material such as leather and mounted for vertical movement in a base 5. The spring loading of the plunger 4 need only be very light. The base 5 is supported on a transverse member 6 on which pendulum weights 7 are secured, the member 6 and weights 7 being supported for fore and aft oscillation about axis $a$—$a$ by arms 8 pivotally supported as at 9 from a gimbal ring 10 which in turn is supported for rotation about axis $b$—$b$ by pivots 11. It is thus seen that the pendulum is universally mounted for movement about the intersection of the axes $a$—$a$ and $b$—$b$, which intersection is coincident with the center of gravity G of the rotor system.

If it is assumed that the rotor 1 is rotating in the direction as indicated by the arrow and the rotor is laterally tilted such that the spin axis is inclined from the pendulum vertical as indicated by the angle theta ($\theta$), Fig. 1, an unbalanced friction force will occur at the point of engagement between elements 3 and 4. This friction force will tend to move the pendulum weights back as seen in Fig. 1 producing a contrary reaction as indicated by arrow F, Fig. 2, on the friction element 3. This reaction force F and its moment about point G may be replaced by an equal force $F_1$ acting in the plane of the center of gravity G of the rotor and a couple comprising forces $F_2$, times the lever arm C equal respectively to the force F and the lever arm of F about the center of gravity of the rotor. The moment $F_2.C$ of the couple due to friction will produce a clockwise torque as seen in Fig. 2 on the gyrorotor 1 which would tend to produce an angular acceleration of the rotor about axis $a$—$a$, Fig. 1.

When a gyroscope rotor is spinning and is acted upon by an external torque normal to the spin axis the spin axle will precess about a third axis normal to the spin and torque axes in such a direction that if continued the spin axis would lie in the axis of the applied torque with the direction of spin in the same direction as the sense of the applied torque. In order to satisfy this general rule with the gyrorotor 1 of Fig. 1 rotating in a clockwise sense as seen from above and an external torque due to the friction erecting device acting in a clockwise sense about axis $a$—$a$ when viewed from right to left, the spin axle must rotate in a clockwise sense about axis $b$—$b$ looking from front to back in order to lie in the torque axis with the direction of spin in the direction of the applied torque. It will thus be apparent that the gyrorotor 1 will precess such that the angle theta is diminished and the spin axis will become coincident with the pendulum vertical. When the spin axis and pendulum vertical are coincident the friction between plunger 4 and friction element 3 produces a torque resisting the rotation of the rotor 1 but produces no torque normal to the spin axis of the rotor. It will be noted that theoretically the friction force between the elements 3 and 4 will be dependent only on the coefficient of friction and the normal force. However, the rubbing velocity will have some effect on the value of the coefficient of friction.

If the lateral inclination $\theta$ is to the opposite side of the pendulum vertical the friction couple will be reversed in sign causing a corresponding reversal in the direction of precession and again causing erection of the gyro spin axle into coincidence with the pendulum vertical. Further, by an exactly similar process, the gyro spin axle will tend to be erected for any tilt about axis $a$—$a$, Fig. 1, or for any tilt about any other axis or combination of axes. In order to prevent hunting the friction force is made very small so that the rate of precession, and hence erection of the gyrorotor, is slow so that the erecting device is suitable for use in conjunction with a gyro employed for example in a flight indicator.

A practical embodiment of the invention in a gyroscopic device suitable for use as an automatic pilot for aircraft is illustrated in Figs. 3 to 5, inclusive.

Referring to these figures, reference numeral 20 indicates a rectangular base provided with vertical uprights 21 longitudinally spaced and each provided with a bearing 23 (see Fig. 4), which bearings serve to journal trunnion pins 24 of an outer gimbal ring 25. The axis of the trunnion pins 24 are, for example, aligned with the longitudinal or rolling axis of an aircraft when the device is employed for automatic control purposes.

The outer gimbal ring 25 is provided with a pair of ball-type trunnion bearings 26 (note Fig. 5), which serve to journal trunnion pins 27 which lie in an axis at right angles to the axis of trunnion pins 24 and in turn are rigidly secured to an inner gimbal ring 30 which is provided with a boss 33 counterbored as at 34 to serve as a mounting for a conventional direct current electric motor 35, the latter being secured in the gimbal frame by means of clamping screws (not shown).

The gimbal ring 30 is bored as at 36 (see Fig. 5) to receive a bearing 37 for the armature shaft 38 of the motor 35 and a fly-wheel or gyrorotor 40 is secured to the shaft 38 to be driven thereby, the rotor being positioned within the gimbal ring 30. The shaft 38 extends through the bearing 37 and at its lower end has a hemispherical head 42 secured thereto for rotation by the motor 35 in unison with the rotor 40. The hemispherical head 42 is preferably made such that its geometrical center coincides with the intersection of the gimbal axis and the inner gimbal ring and motor assembly are so balanced that the center of gravity of the gyro system lies on the intersection of the gimbal axis, and hence the gyroscope is non-pendulous. The head 42 corresponds to the similar element 3 of the device of Figs. 1 and 2 and cooperates with a plunger 45 faced with friction material, as indicated at 46, which engages the smooth outer surface of the head 42. Plunger 45 is provided with a stem portion 47 which is reciprocably guided in a base 49 and urged upward by a biasing spring 48. The base 49 also supports electromagnets 50, the pole pieces 51 of which underlie an iron armature 52 secured to the stem 47 such that when the electromagnet coil 50 are energized, the armature 52 is pulled downward against the resistance of spring 48 and causes disengagement between the friction facing 46 of the plunger 45 with the friction head 42. The plunger 45 corresponds to the friction element 4 of Figs. 1 and 2 and functions in a similar manner as an erecting mechanism in cooperation with the friction head 42 in a manner as explained with respect to the schematic device of Figs. 1 and 2. The electromagnets 50 provide a means for rendering the erecting mechanism inoperative at will so that when the friction plunger 45 is retracted the gyroscopic system is that of a free gyro and under such conditions, except for friction, the axis of shaft 38 would remain fixed in space.

The base 49 and electromagnets 50 are secured to a transverse channel member 55 which has pendulum weights 56 secured to the underside thereof. The channel member 55 is secured at its ends to arms 57, one of which, as seen in Fig. 5, is of insulating material. Each of the arms is provided with an antifriction bearing 58 to provide for movement of the pendulous weights in a fore and aft plane about pivot pins 59 which are secured to a gimbal ring 60 which is, in turn, provided with two antifriction bearings 61 mounted on extensions of the trunnion pins 24 so that the pendulum weights 56 are free to move laterally.

Mounting plates 62 and 63, provided with insulating supports 64 and 65, respectively are positioned on the respective gimbal rings 25 and 30 such that movement of an aircraft in roll or pitch can, through electrical or pneumatic pickoff means (not shown), actuate servomechanism to function as an automatic pilot in a manner well known in the art.

The current is supplied for operation of the electric motor 35 and for the operation of electromagnets 50 from a connector plug 70 (Figs. 3 and 4) which is adapted to be connected to a source of direct current potential (not shown). Current is led from plug 70 by means of a conductor 71 and brush 72 to contact button 73 and conductor 74 to a contact spring 75 which engages a contact button 76 positioned on the end of one of the trunnion pins 27 of the gimbal ring 30 and connected to an insulated conductor positioned within the trunnion pin and serving to conduct current to the motor 35 for operation thereof. The return circuit side of the motor is grounded to the gimbal ring 30, which ground is completed to the battery through suitable contact springs such that rotation of the gimbal rings will not produce variation in resistance in the motor circuit.

Current is also led from plug connection 70 to a switch 70a (Figs. 3 and 4) and through a contact spring 77 to a contact spring 78 mounted on the pendulum support for gimbal 60 from which current is led by means of a conductor 79 and brush 80, spring ring 81 and conductor 82 to the series connected electromagnet coils 50, ground return 83 serving to connect the other side of the electromagnets to the battery circuit through the grounded gimbal rings and frame.

The device illustrated in Figs. 3 to 5, inclusive, operates in a manner identical to that described with reference to Figs. 1 and 2 in that when the assembly is placed in an aircraft and the motor 35 energized, the gyroscope rotor 40 will begin to turn and after attaining a normal speed of operation will tend to maintain the plane of the spin axle 38 fixed in space. The erecting head 42, however, rotates with the rotor 40, and if the spin axis is not coincidental with the average true vertical as determined by the pendulum, erecting forces will be produced by the interaction of the friction existing between the head 42 and plunger 45 to cause the gyroscope to be erected until the sping axis coincides with the axis of plunger 45. This action will take place irrespective of whether the pendulum is displaced along one or both axes and so long as the friction facing 46 of the plunger 45 remains in contact with the friction erecting head 42, erecting forces will be produced whenever there is lack of coincidence between the spin axis and the apparent vertical as determined by the pendulum.

Where the device is mounted on an aircraft the pendulum will be subject, during turns, to accelerating forces causing the pendulum to move out of the true vertical. Under such conditions it may be undesirable to erect the gyro into the plane of the apparent vertical and during such periods as the pendulum is subjected to acceleration forces, the erecting mechanism may be disabled by closing switch 70a which will energize the electromagnets 50 to cause plunger 45 to be retracted, leaving the gyroscopic system operating as a free gyro. The switch 70a may be operated manually or by means of a radio signal actuated remote control system or it may be operated by a rate-of-turn gyroscope in a manner as illustrated in Fig. 6.

As seen in Fig. 6, battery 90, having one terminal thereof grounded by means of conductor 91, supplies current to a conductor 92 and motor 35, the return side 93 of which is grounded to complete the circuit to the battery. Current is also supplied by means of a branch conductor 94 to a spring contact 95 associated with a rate-of-turn gyroscope, generally indicated by the reference numeral 100. The turn gyroscope or turn indicator of conventional design is provided with trunnions 101 adapted to pivotally support a gimbal ring 102 for rotation about a fore and aft axis, the gimbal ring serving as a support for a conventional electrically driven gyroscope 103 which is supplied with current from brush 95 and has its return circuit grounded to complete the circuit to battery 90. The gimbal ring 102 is provided with an arm 104 biased by springs 105 to a normal central position but rotation of the assembly in azimuth will cause precession of the gyroscope 103 to cause rocking of the gimbal ring 102 about trunnions 101, which rocking movement is resisted by one of the springs 105 which will deflect such that rotation of arm 104 will be proportional to the precession torque which is in turn a function of the rate-of-turn of the assembly. Arm 104 is provided at its lower end with a contact 106 which is adapted, upon displacement from the neutral position, to engage either of a pair of adjustable contacts 107 which are electrically connected by means of conductor 108 to the electromagnet coils 50, a return circuit being provided by means of conductor 109. Current from brush 95 is carried through the frame 102 to contact 106 such that if the aircraft upon which the assembly is mounted turns at greater than the predetermined rate determined by the adjustment of contacts 107, the electromagnets 50 will be energized, causing retraction of plunger 45 out of engagement with friction erecting head 42 to leave the spin axis of the gyrorotor 40 fixed in space until the rate-of-turn of the aircraft decreases to the predetermined value.

While the invention has been illustrated and described as utilizing a universally mounted pendulum, it is obvious that the pendulum may be fixed for movement about a single axis, in which case the gyroscope will be erected so that its spin axis will lie in the plane of the true vertical but may be inclined thereto in a plane at right angles to the plane of movement of the pendulum. The spin axle will be erected with respect to the center line of the pendulum plunger. This type of construction would be employed where the gyroscope is sensitive only to pitch or roll but not both.

While the invention has been described as applicable to gyroscopic control systems such as employed in automatic pilots, it is obvious that the erecting mechanism can be employed in flight indicators known as gyro horizons in which the gyroscope rotor is used to determine a reference plane for indicating, through suitable indicating mechanism, the attitude of the aircraft.

It should be further understood that it is not essential that the friction element 42, Figs. 3, 4 and 5, be mounted directly on the rotor shaft but the same may be driven by means of reduction gearing so as to rotate at a considerably slower speed than the rotor. In such a case, however, it is still essential that the friction head 42 rotate in the same direction as the rotor shaft and be mounted concentrically therewith.

While one form of the invention has been illustrated and described, it will be apparent to those skilled in the art that various modifications may be made therein which will come within the scope of the invention as defined in the appended claims.

We claim:

1. In a gyroscope device, a rotor, a spin axle supporting the rotor, gimbal means for rotatably supporting the rotor spin axle for three degrees of freedom, a pendulum member pivotally carried for movement about one of the three axes of freedom of the rotor spin axle, relatively rotatable friction elements mounted respectively on the pendulum member and the rotor spin axle for engagement with each other to precess the rotor spin axle into the pendulum vertical position, resilient means normally maintaining said friction elements in frictional engagement with each other and means responsive to accelerations tending to swing the pendulum member out of vertical for moving one of said friction elements out of frictional contact with the other frictional contact element.

2. In a gyroscope device, a spin axle, a rotor mounted on said spin axle, at least one gimbal ring for supporting the rotor spin axle for rotative freedom about an axis normal to the rotary axis of the spin axle, a gravity controlled pendulum member supported to define an average true vertical at least in the plane normal to said axis of rotative freedom, a pair of relatively rotatable friction elements movable to and from frictional engagement with each other, one of said friction elements being mounted on and rotatable with the rotor spin axle and the other friction element being constructed and arranged such that the tilt of the spin axle relative to the pendulum vertical, when the friction elements are in engagement with each other, produces a torque on the rotor spin axle causing the rotor to precess the rotor spin axle into coincidence with the pendulum vertical, resilient means normally holding the friction elements in frictional engagement with each other, electromagnetic means energizable to move one of said friction elements out of frictional engagement with the other friction element, and acceleration responsive means for energizing said electromagnetic means when the rate of acceleration exceeds a predetermined rate to disengage the friction elements.

3. In a gyroscope for establishing a horizontal reference line, a power driven rotor element having a vertical spin axle, a gimbal ring pivotally supported for rotation about at least one horizontal axis, bearing means in the gimbal ring for journalling said spin axle for rotation, and said spin axle extending downwardly below said gimbal ring, a head in the form of a spherical segment concentrically mounted on the extended portion of said spin axle, a gravity controlled pendulum for establishing an average vertical, a spring loaded normally engaging retractable plunger carried by said pendulum frictionally engaging said head, an electromagnet mounted on said pendulum for retracting the plunger, and rate of turn responsive means for energizing said electromagnet to disengage the plunger from the head during turns.

4. In a gyroscope device for establishing a horizontal reference line, a power driven rotor element having a vertically disposed spin axle, a gimbal ring pivotally carried for rotation about at least one horizontal axis, bearing means in said gimbal ring for rotatively journalling said spin axle, said spin axle extending downwardly below said gimbal ring, a head in the form of a spherical segment concentrically mounted on the extended portion of the spin axle, a gravity controlled pendulum for establishing an average true vertical, a spring loaded retractable plunger carried by the pendulum normally in frictional contact with the rotative center of the spherical surface of the head when the spin axle and the pendulum are vertical, electrically controlled disengaging means for disengaging the plunger from the spherical surface of said head including a normally open energizing circuit, a rate of turn gyroscope having a spin axis tiltable incident to turning movements in excess of a predetermined rate of an aircraft on which the gyroscope device is mounted, and circuit closing means operable by a predetermined degree of tilt of said rate of turn gyroscope spin axis for closing said energizing circuit to disengage said plunger from the spherical head during said tilting movements in excess of said predetermined degree of tilt of the rate of turn gyroscope spin axis to automatically interrupt the erection of the rotor spin axis during said tilting of the rate of turn gyroscope spin axis.

WILLIAM R. WEEMS.
ROBERT A. WRIGHT.

REFERENCES CITED

The following references are of record in the file of this patent:

UNITED STATES PATENTS

| Number | Name | Date |
|---|---|---|
| 1,825,345 | Fieux | Sept. 29, 1931 |
| 2,267,411 | McNairy | Dec. 23, 1941 |
| 2,339,606 | Sias | Jan. 18, 1944 |
| 2,422,120 | Noble | June 10, 1947 |
| 2,428,925 | Borell | Oct. 14, 1947 |

FOREIGN PATENTS

| Number | Country | Date |
|---|---|---|
| 849,190 | France | Aug. 7, 1939 |
| 141,477 | Great Britain | Apr. 22, 1920 |
| 166,800 | Great Britain | July 28, 1921 |
| 291,047 | Great Britain | Mar. 19, 1928 |